United States Patent
Lee et al.

(10) Patent No.: US 7,079,519 B2
(45) Date of Patent: Jul. 18, 2006

(54) CORE NETWORK SEPARATION STRUCTURE AND SIGNAL PROCESSING METHOD THEREOF IN MOBILE COMMUNICATION SYSTEM

(75) Inventors: Sang-Heon Lee, Seoul (KR); Young-Jin Kim, Seoul (KR); Seong-Hun Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 917 days.

(21) Appl. No.: 09/935,865

(22) Filed: Aug. 23, 2001

(65) Prior Publication Data

US 2002/0150084 A1    Oct. 17, 2002

(30) Foreign Application Priority Data

Aug. 23, 2000  (KR) ............................... 2000-50228

(51) Int. Cl.
*H04Q 7/24*   (2006.01)
*H04L 12/28*  (2006.01)

(52) U.S. Cl. .................... 370/338; 370/389; 370/395.2

(58) Field of Classification Search ................ 370/310, 370/328, 351.3, 389, 401, 431, 464–469, 370/442, 337, 347, 321; 455/403, 436, 433, 455/445, 461, 426
See application file for complete search history.

(56) References Cited

U.S. PATENT DOCUMENTS

| | | | |
|---|---|---|---|
| 6,415,151 B1 * | 7/2002 | Kreppel | 455/445 |
| 6,442,401 B1 * | 8/2002 | Behan | 455/552.1 |
| 6,574,201 B1 * | 6/2003 | Kreppel | 370/328 |

* cited by examiner

*Primary Examiner*—Huy D. Vu
*Assistant Examiner*—Daniel Ryman
(74) *Attorney, Agent, or Firm*—Dilworth & Barrese LLP

(57) ABSTRACT

The present invention provides a core network separation structure and a signal processing method between separated elements. In particular, an SGSN is divided into an SGSN server for control operations and an S-MGW for switching packet data, and a GGSN is divided into a GGSN server for control operations and a G-MGW for switching packet data. Signaling interfaces interface between the separated elements, SGSN server and S-MGW and between the GGSN server and the G-MGW.

6 Claims, 8 Drawing Sheets

CORE NETWORK SEPARATION STRUCTURE AND SIGNAL PROCESSING METHOD THEREOF IN MOBILE COMMUNICATION SYSTEM

PRIORITY

This application claims priority to an application entitled "Core Network Separation Structure and Signal Processing Method Thereof in Mobile Communication System" filed in the Korean Industrial Property Office on Aug. 23, 2000 and assigned Serial No. 2000-50228, the contents of which are hereby incorporated by reference.

BACKGROUND OF THE INVENTION

1. Field of the Invention

The present invention relates generally to a core network separation structure and a signal processing method thereof, and in particular, to separation of packet data processing elements and signaling processing elements in a packet-switched domain and a signal processing method between the separated elements.

2. Description of the Related Art

A mobile communication system generally refers to a system that services voice and data over a wireless communication network. The mobile communication system is implemented in diverse ways and the major examples are a circuit switching network and a packet switching network.

A network for the mobile communication system should be so configured as to efficiently transmit voice and data. This network requirement will be more pressing in a future mobile communication system (IMT 2000) from which it is expected that an increased volume of data will be transmitted to provide multimedia services.

The future mobile communication system for which work is ongoing to establish standards defines the following network requirements.

(1) Independence of transmission technology for applying a transmission function from a higher service.

(2) Separation criteria whereby call processing is separated from transmission.

(3) Separation of technologies that will be evolved in different forms.

There has already been defined a core network separation structure on the above principles in a circuit-switched domain. FIG. 1 illustrates the core network separation structure of the circuit-switched domain in the circuit switching network of a conventional mobile communication system. As shown in FIG. 1, the conventional mobile communication system is divided largely into a circuit switching network and a packet switching network. The circuit switching network processes circuit data including voice and the packet switching network processes packet data.

Referring to FIG. 1, an MSC (Mobile Switching Center) being a core network (CN) in the circuit-switched domain is separated into an MSC server and a media gateway (MGW). The MSC server is connected to a UTRAN (UMTS Terrestrial Access Network) through a predetermined signaling interface and processes signaling in the circuit-switched domain. That is, the MSC server processes signaling necessary to interface circuit data with the UTRAN or a GMSC (Gateway MSC). The UTRAN includes plurality of Node B which corresponds to a (BTS (Base station transmission System) connected to respective RNC(Radio Network Controller) and MSC. The MGW is connected to the UTRAN through a predetermined data transfer interface and switches circuit data in the circuit-switched domain. For this purpose, a protocol must be defined between the MSC server and the MGW to exchange information. MeGaCo (Media Gateway Control) protocol of IETF, which is also defined in H.248 of ITU-T, is adopted for example. Meanwhile, the GMSC connected to the PSTN (Public Switched Telephone Network) is separated into a GMSC server and an MGW. The MGW of the GMSC is connected to the MGW of the MSC through a predetermined data transfer interface and switches circuit data between the PSTN and the CN. The GMSC server is connected to the MSC server through a predetermined signaling interface and processes signaling required for switching circuit data between the PSTN and the CN. For this purpose, a protocol must be defined between the GMSC server and the MGW of the GMSC to exchange information.

As described above, the circuit switching network in the conventional mobile communication system has separate circuit data processing elements (the MGWs) and signaling processing elements (the MSC server and GMSC server).

However, a core network separation structure of the packet-switched domain is yet to be explored in the packet switching network. In the existing defined core network structure of the packet-switched domain, the UTRAN is connected to an SGSN (Serving GPRS (General Packet Radio Service) Support Node) through a predetermined signaling and data transfer interface. The SGSN is connected to a GGSN (Gateway GPRS Support Node) via a signaling and data transfer interface. On the other hand, the GGSN is connected to multimedia IP (Internet Protocol) networks. The SGSN functions for switching and signaling to interface packet data with the UTRAN. The GGSN switches and processes signaling to interface packet data with the multimedia IP networks.

The core network in the packet-switched domain has not yet been separated into elements. While some separation structures for the SGSN have been proposed, there is no separation structure defined for the GGSN. Besides exploration of a separation structure for the core network in the packet-switched domain, an information flow between separated elements should be defined in detail at the same time.

SUMMARY OF THE INVENTION

An object of the present invention is, therefore, to provide a core network with a separation structure in a packet-switched domain.

Another object of the present invention is to provide a signal processing method between separated elements in a core network with a separation structure.

A further object of the present invention is to provide definitions of nodes and interfaces for a core network separation structure in a packet-switched domain.

Still another object of the present invention is to provide information flow between logical function blocks in relation to packet-related state changes.

The foregoing and other object of the present invention are achieved by providing a core network separation structure and a signal processing method between separated elements. According to one aspect of the present invention, an MS (mobile station) transmits a first message requesting PDP (Packet Data Protocol) context activation to an SGSN server. The SGSN server transmits a second message representative of a switching path for an S-MGW (SGSN-MGW) to the S-MGW in order to establish a forward transmission path for transmitting the packet data between the S-MGW and a G-MGW (GGSN-MGW). The S-MGW transmits a response message for the second message to the SGSN server. The SGSN server transmits a third message requesting PDP context creation to a GGSN server in response to the response message of the second message. The GGSN server transmits a fourth message representative of a switching path for the G-MGW to the G-MGW in order to establish a reverse transmission path for transmitting the packet data between the G-MGW and the S-MGW. The G-MGW transmits a response message for the fourth message to the GGSN server. The GGSN server transmits a response message for the third message to the SGSN server in response to the response message of the fourth message. The SGSN server establishes the reverse transmission path for the S-MGW by the response message of the third message. Then, the SGSN server transmits a message indicating completed establishment of the forward and reverse transmission paths to the MS. Thus, packet data transmission paths are established in a packet switching network.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described hereinbelow with reference to the accompanying drawings. In the following description, well-known functions or constructions are not described in detail since they would obscure the invention in unnecessary detail.

Separation of an SGSN and a GGSN in a packet-switched domain will be described below in relation to the operations and definitions of function blocks and interfaces between function blocks, in comparison with the existing core network structure in the packet-switched domain. By the application of the existing SGSN separation rules to separation of the GGSN, the future evolution and expansion of network structures in the packet-switched domain are supported. To implement and verify the functionality of the suggested separation structure, an information flow between function blocks must be defined. Therefore, MegaCo/H.248 model-based messages will be defined between an internal server and an MGW separated from the GGSN in the mobile communication system.

Before presenting a detailed description of the present invention, terms used herein will be defined.

Figure 1:
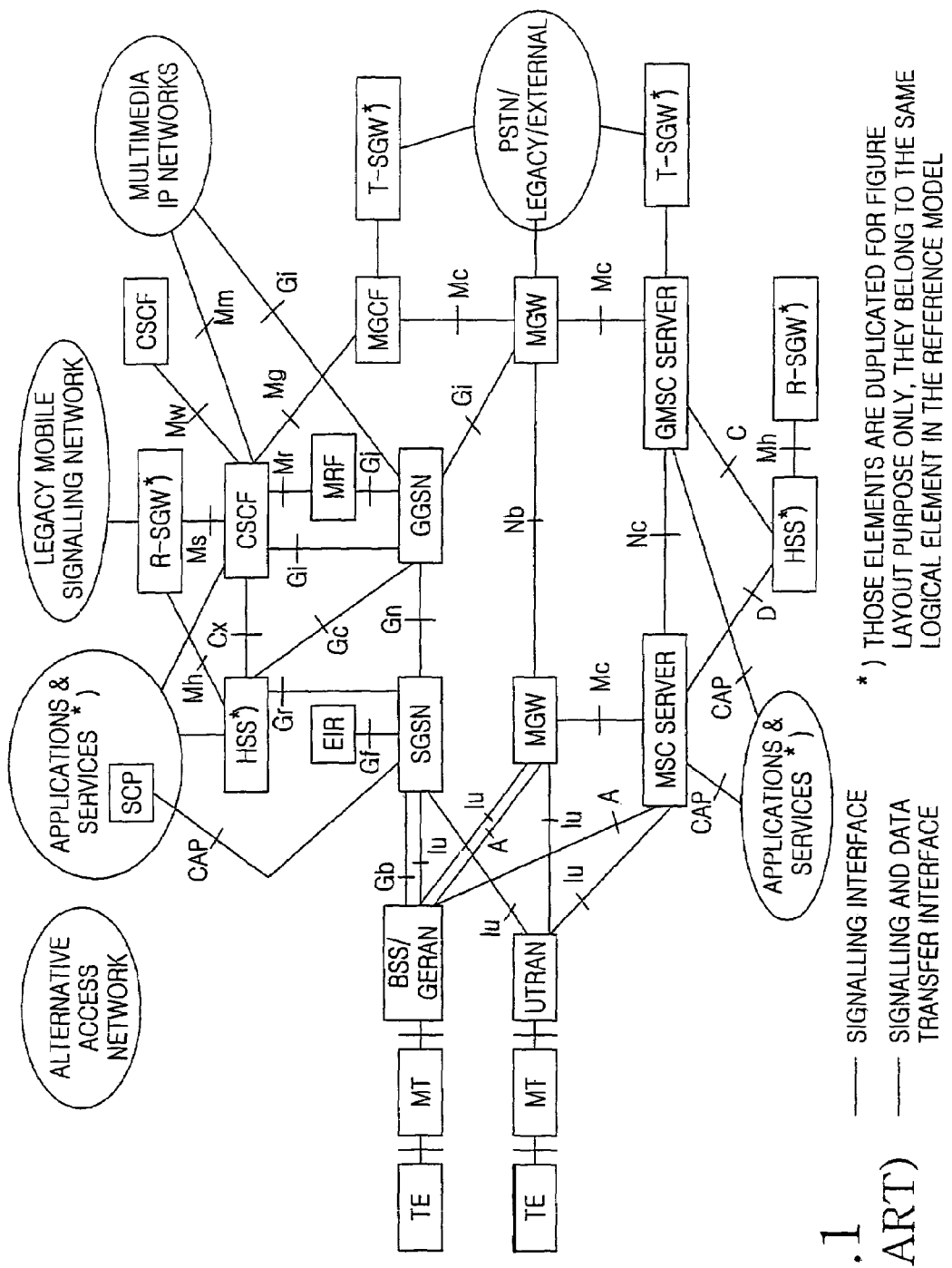
FIG. 1 illustrates a core network separation structure in a conventional circuit-switched domain.
Figure 2:
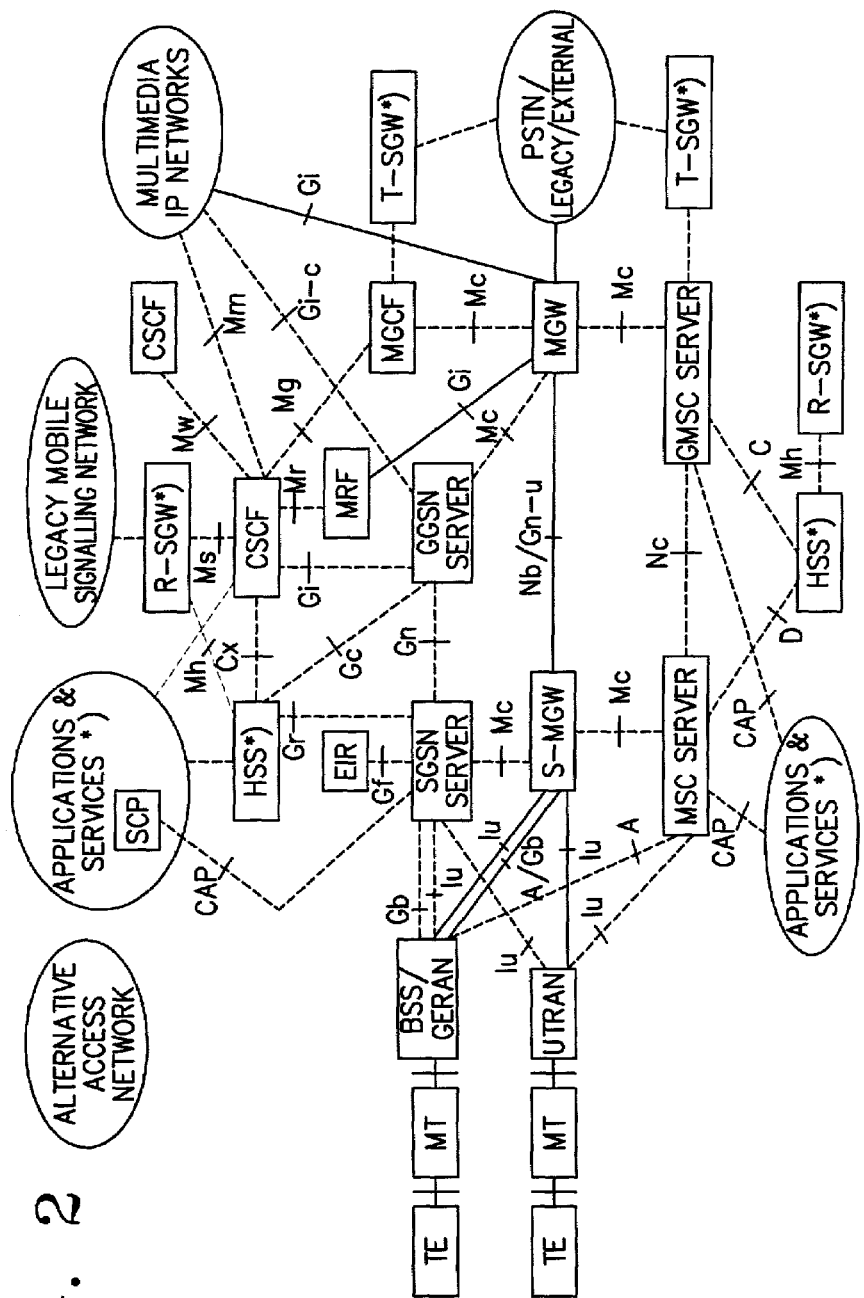
FIG. 2 illustrates a core network separation structure in a packet-switched domain according to an embodiment of the present invention.

PDP: Packet Data Protocol
RNC: Radio Network Controller
RNS: Radio Network Subsystem
SRNS: Serving RNS
GPRS: General Packet Radio Service
GSN: GPRS Supporting Node
SGSN: Serving GSN
GGSN: Gateway GSN
QoS: Quality of Service
TEID: Tunnel Endpoint Identifier
IPv4: IP version 4
IPv6: IP version 6
MGW: Media Gateway
S-MGW: SGSN-MGW
G-MGW: GGSN-MGW
GTP: GPRS Tunneling Protocol FIG. 2 illustrates a core network structure in a mobile communication system according to an embodiment of the present invention. As shown in FIG. 2, an SGSN and a GGSN, which are known as core networks in the existing packet-switched domain, each are divided into a packet data processing element and a signaling processing element. The SGSN is divided into an S-MGW for processing packet data and an SGSN server for processing signaling. The GGSN is divided into a G-MGW for processing packet data and a GGSN server for processing signaling. Meanwhile, a new protocol must be defined to share information between separated elements. An expanded MeCaCo/H.248 protocol is basically used to control interfacing between the separated elements.

The core network separation structure according to the embodiment of the present invention will be described in detail referring to FIG. 2. The SGSN server is connected to a UTRAN through a signaling interface Iu and to the GGSN server by a signaling interface Gn-c, for performing the conventional signaling process. The SGSN server has the responsibility for functions including, for example, session management, mobility management, GTP-C endpoint, MAP endpoint, and RANAP endpoint, S-MGW selection, and S-MGW control.

The S-MGW is connected to the UTRAN through a data transfer interface A/Gb and switches user data received from the UTRAN to the G-MGW by converting the user packet data in the form of a GTP-U PDU (GTP-User Protocol Data Unit). The S-MGW is connected to the G-MGW through a data transfer interface Nb/Gn-u, for switching packet data received from the G-MGW to the UTRAN.

Meanwhile, the SGSN server needs to control packet data switching in the S-MGW by signaling and so the SGSN server is connected to the S-MGW through a new defined signaling interface Mc.

The GGSN server is connected to the SGSN server through the new defined signaling interface Gn-c and to multimedia IP networks through a signaling interface Gi-c for the conventional signaling process. The GGSN server has the responsibility for functions including, for example, session management, mobility management, GTP-C endpoint, assignment of dynamic IP addresses, transfer of DHCP messages, FA server for terminal IP, RADIUS server, and G-MGW control.

The G-MGW is connected to the S-MGW through a data transfer interface Nb/Gn-u to switch user packet data received from the S-MGW to the multimedia IP networks. That is, the G-MGW serves as a protocol converter to transmit the user packet data to the multimedia IP networks. The G-MGW is connected to the multimedia IP networks through a data transfer interface Gi to switch packet data received from the multimedia IP networks to the S-MGW. In this case, the G-MGW serves as a protocol converter to transmit the packet data to the S-MGW.

Meanwhile, the GGSN server needs to control packet data switching in the G-MGW by signaling and so the GGSN server is connected to the G-MGW via the new defined signaling interface Mc.

In the above-described packet-switched domain, the G-MGW and the S-MGW are implemented at the same node as the MGWs in the circuit-switched domain to offer efficient resources distribution. The new defined interface Gn-u takes care of packet data transmission, and the interface Gn-c takes charge of signaling based on control information. The control information includes Create PDP Context Request/Response information, MODIFY PDP Context Request/Response information, and Delete PDP Context Request/Response information. As in the conventional packet-switched domain, the control information is formatted as defined by TR 23.060 v3.4.0 under the same circumstances.

There will be given lists of messages for use in the procedures according to the embodiment of the present invention.

Table 1 shows a new PDP setup request message ADD Request directed from the SGSN server and the GGSN server to the S-MGW and the G-MGW, respectively.

TABLE 1

| Information | Use |
|---|---|
| Context Identifier | Each packet connection identifier |
| PDP Type | Type of packet data protocol for end user (IPv4, IPv6, PPP) |
| PDP Address | PDP address for end user (IPv4 address or IPv6 address) |
| UTRAN Identifier | UTRAN identifier to be connected |
| Peer GSN Identifier | GSN identifier of the other party to be connected |
| Peer Transport IP Address | Transport IP address for peer MGW (only by GGSN server) |
| Peer Transport TEID | Transport GTP TEID for peer MGW (only by GGSN server) |
| Requested QoS | QoS information requested by end user |

In Table 1, Peer Transport IP Address and Peer Transport TEID are provided from the G-MGW to the S-MGW and the other information is provided from the servers to the MGWs.

Table 2 shows the structure of a response message ADD Response for ADD Request, directed from the MGWs to the servers.

TABLE 2

| Information | Use |
|---|---|
| Context Identifier | Each packet connection identifier |
| Result | Result from processing new PDP setup request message ADD Request |
| My Transport IP Address1 | First transport IP address for MGW |

TABLE 2-continued

| Information | Use |
|---|---|
| My Transport TEID1 | First transport GTP TEID for MGW |
| My Transport IP Address2 | Second transport IP address for MGW (only by SGSN server) |
| My Transport TEID2 | Second transport GTP TEID for MGW (only by SGSN server) |
| Negotiated QoS | QoS information negotiated with MGW |

In Table 2, My Transport IP Address1 and My Transport TEID1 are provided from an UTRAN to the G-MGW through the S-MGW and My Transport IP Address2 and My Transport TEID2 are provided from the G-MGW to the S-MGW.

Table 3 shows the structure of a modify request message MODIFY Request directed from the servers to the MGWs.

TABLE 3

| Information | Use |
|---|---|
| Context Identifier | Each packet connection identifier |
| Modify Type | Modify type identifier (PDP address modify, TEID modify, QoS modify) |
| PDP Type | PDP type for modification when modify type identifier is PDP address |
| PDP Address | PDP address for modification when modify type identifier is PDP address |
| Peer Transport IP Address | Transport IP address for peer MGW when modify type identifier is TEID |
| Peer Transport TEID | Transport GTP TEID for peer MGW when modify type identifier is TEID |
| Requested QoS | QoS information for modification when modify type identifier is QoS |

In Table 3, Peer Transport IP Address and Peer Transport TEID are provided from the UTRAN to the G-MGW through the S-MGW.

Table 4 shows the structure of a response message MODIFY Response for MODIFY Request, directed from the MGWs to the servers.

TABLE 4

| Information | Use |
|---|---|
| Context Identifier | Each packet connection identifier |
| Result | Result from processing modify request message MODIFY Request |
| My transport IP Address | Transport IP address for MGW when modify type identifier of MODIFY Request is TEID (only by GGSN server) |
| My Transport TEID | Transport GTP TEID for MGW when modify type identifier of MODIFY Request is TEID (only by GGSN server) |
| Negotiated QoS | Negotiated QoS information from MGW when modify type identifier of MODIFY Request is TEID |

In Table 4, My Transport IP Address and My Transport TEID are provided from the S-MGW to the G-MGW.

Table 5 shows the structure of a PDP subtract request message SUBTRACT Request directed from the servers to the MGWs.

TABLE 5

| Information | Use |
| --- | --- |
| Context Identifier | Each packet connection identifier |

Table 6 shows the structure of a response message SUBTRACT Response for SUBTRACT Request, directed from the MGWs to the servers.

TABLE 6

| Information | Use |
| --- | --- |
| Context Identifier | Each packet connection identifier |
| Result | Result from processing PDP subtract request message SUBTRACT Request |

The above messages are modifications to some of the existing H.248 protocol messages to support a UMTS packet network with a separation structure. Therefore, they are shown to include mainly information elements to be added.

Figure 3:
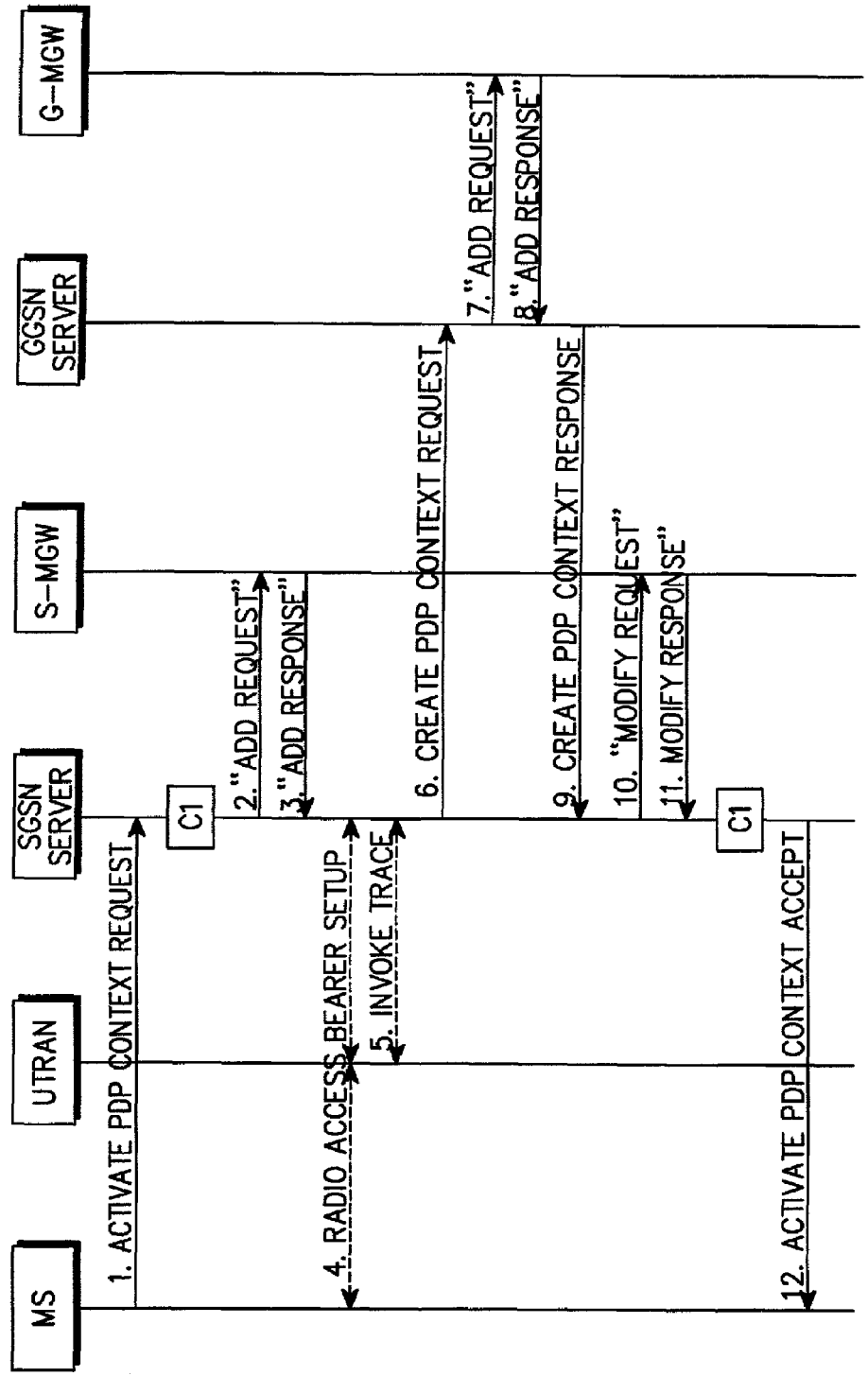
FIG. 3 is an information flow diagram illustrating call setup in the packet-switched domain according to the embodiment of the present invention.

FIG. 3 is a diagram showing an information flow for an initial call setup, that is, to establish initial paths in the packet-switched domain according to the embodiment of the present invention. The steps shown in FIG. 3 except steps 2, 3, and 7 through 11 are described in "3GPP TS 23.060 v3.4.0".

Referring to FIG. 3, a mobile station (MS) transmits a first message, Activate PDP Context Request to an SGSN server through a UTRAN to request activation of a PDP context in step 1. The Activate PDP Context Request message is provided through the signaling interface between the UTRAN and the SGSN shown in FIG 2. In step 2, the SGSN server transmits a second message, ADD Request to the S-MGW through the signaling interface Mc shown in FIG. 2, to request new PDP activation. The ADD Request message designates the S-MGW as the termination of a GTP-U tunnel. The SGSN server includes information about switching packet data directed from the MS to the UTRAN in the ADD Request message. The switching information is required for the S-MGW to switch the packet data received from the MS to the G-MGW.

Upon receipt of the ADD Request message, the S-MGW establishes a forward transmission path to provide the packet data received from the MS to the G-MGW. Then, the S-MGW transmits a response message ADD Response for ADD Request to the SGSN server through the signaling interface Mc in step 3. A TEID with which the G-MGW will transmit packet data (GTP-U PDU) to the S-MGW and the IP address of the S-MGW are inserted into the ADD Response message. The S-MGW establishes a reverse transmission path by the TEID for the G-MGW and the IP address of the S-MGW. Upon receipt of the ADD Response message, the SGSN server performs a radio access bearer (RAB) setup procedure, Radio Access Bearer Setup for the UTRAN and the MS in step 4. If a corresponding UTRAN trace is activated by the procedure of step 4, the SGSN server transmits an Invoke Trace message to the UTRAN in step 5. The Invoke Trace message is composed of Trace Reference, Trace Type, Trigger ID, and OMC Identity. Trace Reference and Trace Type are set in trace information received from an HLR (Home Location Register) or an OMC.

In step 6, the SGSN server transmits a third message, Create PDP Context Request to the GGSN server through the signaling interface Gn-c shown in FIG. 2 to request PDP context creation for a new call connection. The Create PDP Context Request message includes the TEID for the G-MGW to the S-MGW and the IP address of the S-MGW. Upon receipt of the Create PDP Context Request message, the GGSN server transmits a fourth message, ADD Request to the G-MGW through the signaling interface Mc to request the new PDP context creation in step 7. The new PDP activation refers to establishing the reverse transmission path for transmitting packet data from the G-MGW to the S-MGW. The ADD Request message includes the TEID for the G-MGW and the IP address of the S-MGW.

Upon receipt of the ADD Request message, the G-MGW establishes the reverse transmission path by the TEID and IP address included in the ADD Request message. Then, the G-MGW transmits a response message ADD Response for the ADD Request message to the GGSN server in step 8. The ADD Response message includes a TEID with which the S-MGW transmits a GTP-U PDU to the G-MGW and the IP address of the G-MGW.

Upon receipt of the ADD Response message, the GGSN server transmits a response message Create PDP Context Response for the Create PDP Context Request message to the SGSN server in step 9. The Create PDP Context Response message includes the TEID for the S-MGW and the IP address of the G-MGW, received by the ADD Response message. While not shown in FIG. 3, the SGSN server transmits the TEID for the S-MGW and the IP address of the G-MGW received by the Create PDP Context Response message to the S-MGW by a predetermined message.

If it is necessary to change packet data processing-related information, the SGSN server transmits a MODIFY Request message to the S-MGW in step 10. As shown in Table 3, MODIFY Request includes Modify Type Identifier and other modification information. Upon receipt of the MODIFY Request message, the S-MGW modifies information designated by the Modify Type Identifier according to the modification information. When the information modification is completed, the S-MGW transmits a response message MODIFY Response for the MODIFY Request message to the SGSN server in step 11. If the new PDP activation is completed in the above procedure, the SGSN server transmits an Activate PDP Context Accept message to the MS, notifying that a PDP address is completely assigned, in step 12. Completion of PDP address assignment implies that both the forward and reverse transmission paths have been established.

As described above referring to FIG. 3, steps 2, 3, and 7 through 11 are additionally performed to process signals between the separated elements SGSN server and S-MGW and between the separated elements GGSN server and G-MGW for new PDP address assignment in the embodiment of the present invention.

Figure 4:
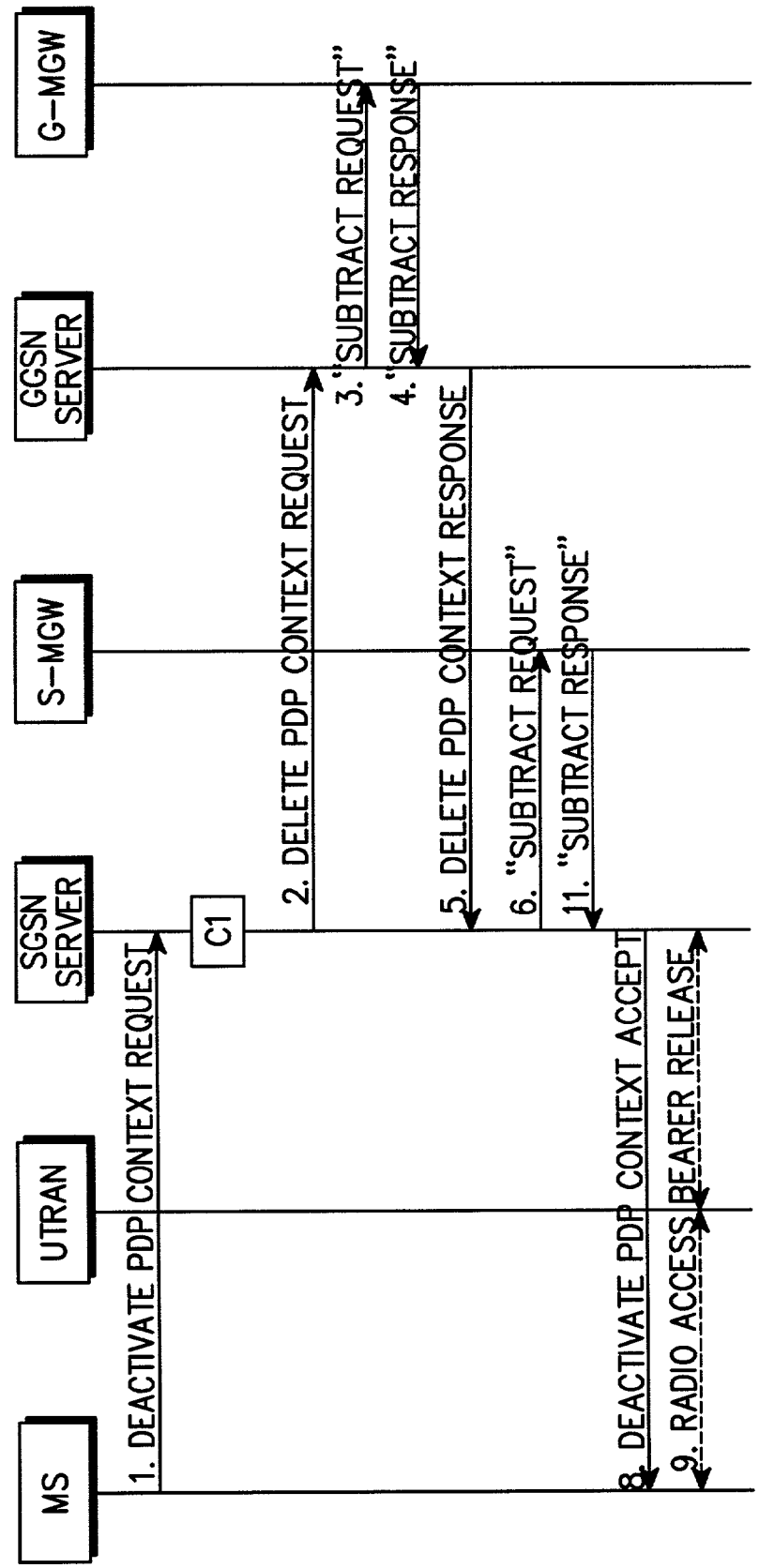
FIG. 4 is an information flow diagram illustrating call release in the packet-switched domain according to the embodiment of the present invention.

FIG. 4 is a diagram illustrating an information flow for call release in the packet-switched domain according to the embodiment of the present invention. The steps shown in FIG. 4 except steps 3, 4, 6, and 7 are described in "9.2.4.1 of 3GPP TS 23.060 v3.4.0".

Referring to FIG. 4, the MS transmits a Deactivate PDP Context Request message to the SGSN server to request deactivation of an existing PDP context in step 1. Upon receipt of the Deactivate PDP Context Request message, the SGSN server transmits a Delete PDP Context Request message to the GGSN server to request deletion of the PDP context in step 2. Then, the GGSN server transmits a SUBTRACT Request message to the G-MGW through the signaling interface Mc to request deletion of the PDP context in step 3. The G-MGW deactivates the PDP context and transmits a SUBTRACT Response message for the SUBTRACT Request message to the GGSN server in step 4. Deactivation of the PDP context refers to release of the forward and reverse transmission paths established according to the procedure of FIG. 3. The GGSN server transmits a Delete PDP Context Response message for the Delete PDP Context Request message to the SGSN server in step 5. In step 6, the SGSN server transmits the SUBTRACT Request message to the S-MGW through the signaling interface Mc to request deactivation of the PDP context. The S-MGW deactivates the PDP context and then transmits a SUBTRACT Response message for the SUBTRACT Request message to the SGSN server in step 7. Deactivation of the PDP context refers to release of the forward and reverse transmission paths established in the procedure of FIG. 3. In step 8, the SGSN server transmits a Deactivate PDP Context Accept message to the MS, notifying that the PDP context deactivation is accepted. In step 9, the MS and the SGSN server perform a Radio Access Bearer Release procedure to release the PDP context whose deactivation was accepted.

As described above referring to FIG. 4, steps 3, 4, 6, and 7 are additionally performed to process signals between the separated elements SGSN server and S-MGW and between the separated elements GGSN server and G-MGW for new PDP context deactivation in the embodiment of the present invention.

Figure 5:
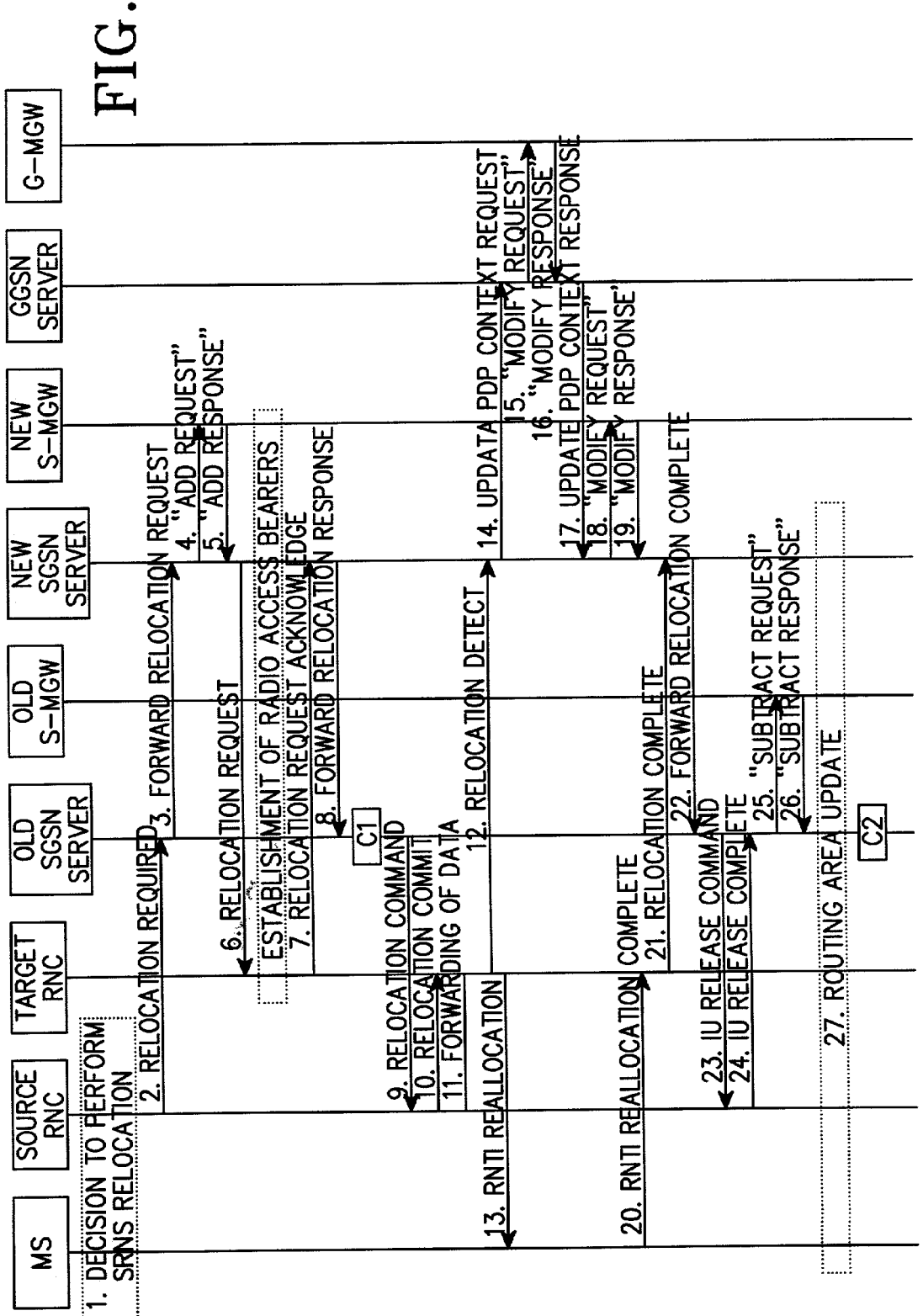
FIG. 5 is an information flow diagram illustrating SRNS (Serving Radio Network Subsystem) relocation (handover) in the packet-switched domain according to the embodiment of the present invention.
Figure 6:
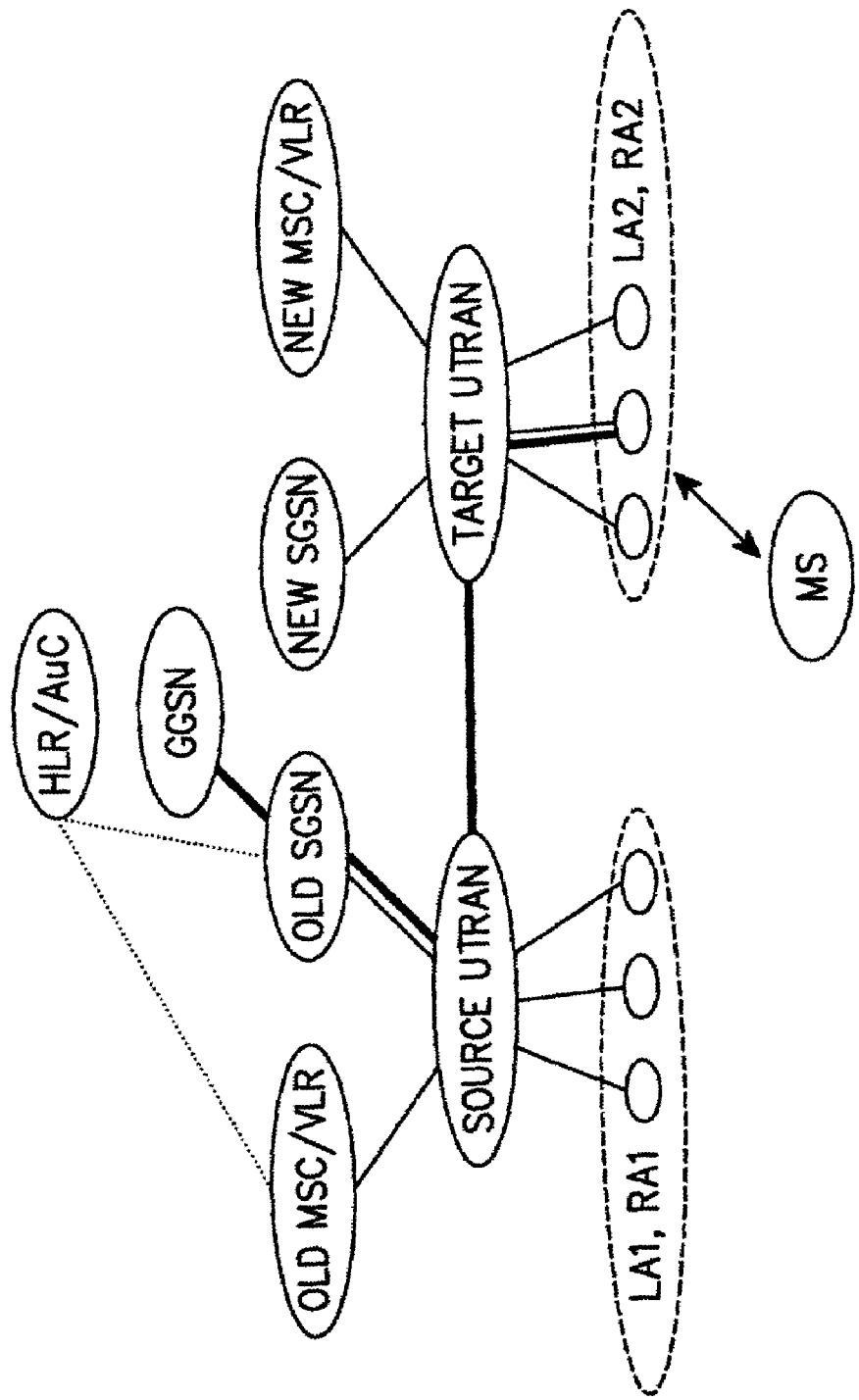
FIG. 6 conceptively illustrates a core network architecture where signals are processed in the procedure shown in FIG. 5.

FIG. 5 is an information flow diagram for SRNS relocation (handover) in the packet-switched domain according to the embodiment of the present invention and FIG. 6 conceptively shows a core network architecture for the signal processing of FIG. 5. The steps shown in FIG. 5 except steps 4, 5, 15, 16, 18, 19, 25, and 26 have already been defined in "9.2.4.1 of 3GPP TS 23.060 v3.4.0". The signal processing shown in FIG: 5 occurs when a source RNC in which an MS is registered before a SRNS relocation generates an MS relocation request in the presence of traffic being transmitted or received from or at the MS. This is termed SRNS relocation.

If the MS requests an SRNS relocation while transmitting or receiving traffic by an assigned PDP address in step 1, a source RNC transmits a Relocation Required message to an old SGSN server in step 2. The old SGSN server transmits a Forward Relocation Request message to a new SGSN server in step 3. The new SGSN server transmits an ADD Request message notifying that the MS location is changed to a new S-MGW via the signaling interface Mc shown in FIG. 2 in step 4. After updating the MS location information, the new S-MGW transmits an ADD Response message for the ADD Request message to the new SGSN server via the signaling interface Mc in step 5. The new SGSN server transmits a Relocation Request message requesting SRNS relocation of the MS to a target RNC to which the MS moves in step 6. The target RNC performs a predetermined process of accessing a channel to provide a packet service to the MS. If the packet service is available to the MS, the target RNC transmits a Relocation Request Acknowledge message to the new SGSN server in step 7. In step 8, the new SGSN server transmits a Forward Relocation Response message for the Forward Relocation Request message to the old SGSN server. The old SGSN server transmits a Relocation Command message to the source RNC, requesting SRNS relocation to be performed, in step 9. Then, the source RNC transmits a Relocation Commit message to the target RNC, notifying that the Relocation Command message has been received from the packet-switched domain in step 10. The source RNC forwards data to the target RNC in step 11. The target RNC transmits a Relocation Detect message to the new SGSN server, notifying that the relocation has been detected in step 12. After having sent the Relocation Detect message, target SRNC responds to the MS by sending a RNTI Reallocation message in step 13. In step 14, the new SGSN server transmits an Update PDP Context Request message to the GGSN server so that the GGSN server updates the location information of the MS with information indicative of the MS moving from the source RNC to the target RNC. The GGSN server updates the location information of the MS and then transmits a MODIFY Request message to the G-MGW, requesting update of the MS location information in step 15. The G-MGW updates the MS location information and transmits a MODIFY Response message for the MODIFY Request message to the GGSN server in step 16. The GGSN server transmits an Update PDP Context Response message for the Update PDP Context Request message to the new SGSN server in step 17.

In step 18, the new SGSN server transmits a MODIFY Request message requesting the update of the MS location information to the new S-MGW. After the MS location information update, the new S-MGW transmits a MODIFY Response message for the MODIFY Request message to the new SGSN server in step 19.

When the MS location information is completely updated in the above procedure, the MS requests release of existing channels to the old SGSN server in steps 20 through 24. The old SGSN server transmits a SUBTRACT Request message requesting release of an existing call to the old S-MGW in Step 25. In Step 26, the old S-MGW transmits a SUBTRACT Response message for the SUBTRACT Request message to the old SGSN server, thereby terminating the SRNS relocation. A Routing Area update is then performed in step 27.

As described above referring to FIG. 5, steps 4, 5, 15, 16, 18, 19, 15 and 26 are additionally performed to process signals between the separated elements SGSN server and S-MGW and between the separated elements GGSN server and G-MGW for SRNS relocation (handover) in the embodiment of the present invention.

Figure 7:
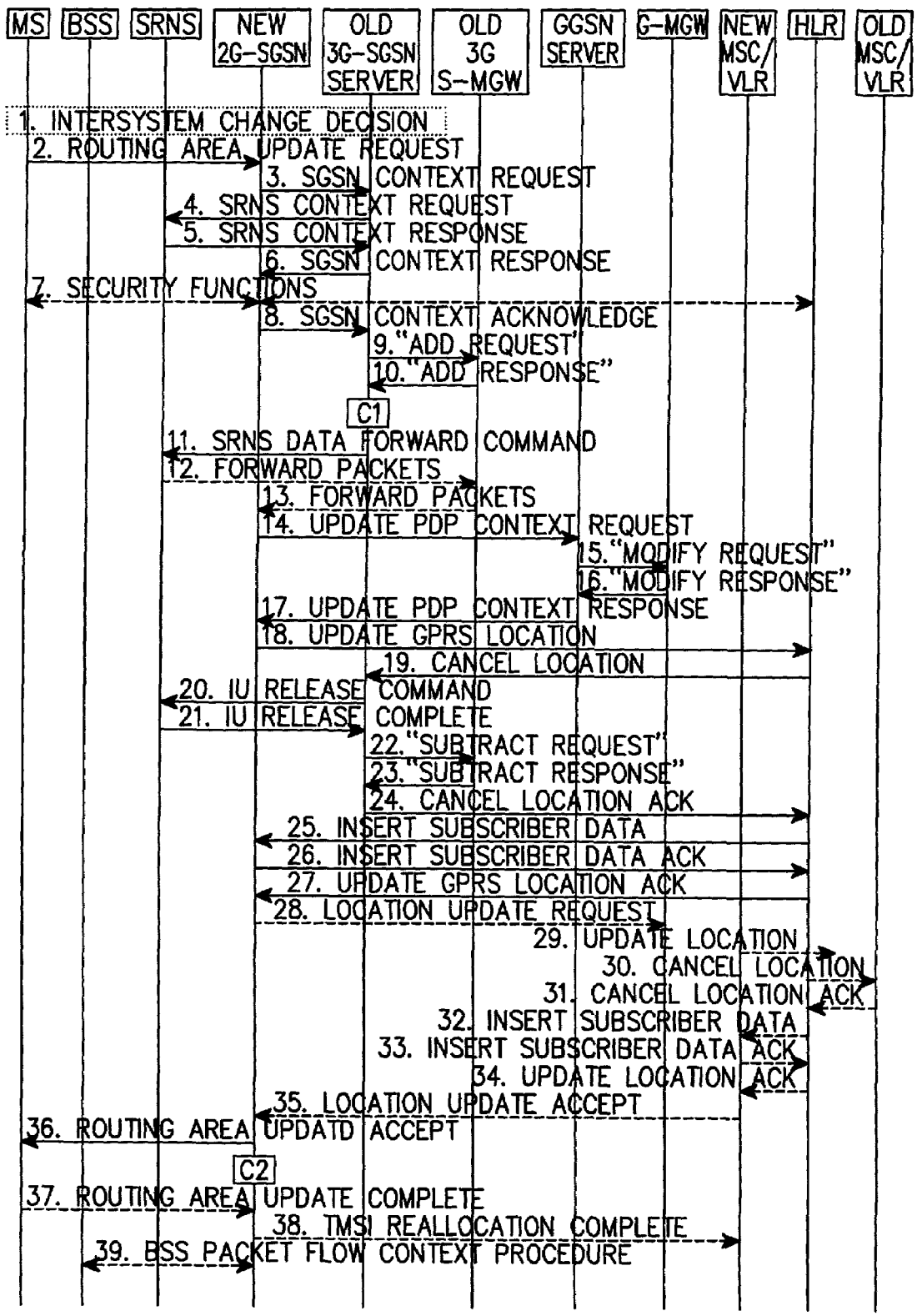
FIG. 7 is an information flow diagram illustrating UMTS to GSM inter-SGSN change (as an embodiment of location registration and routing area update) according to the present invention.

FIG. 7 is a signal flow diagram UMTS to GSM inter SGSN change according to the present invention. In FIG. 7, location registration is performed from a core network with separated elements (an old 3G-SGSN server and an old 3G S-MGW) according to the present invention to a conventional core network with a non-separate structure (a new 2G-SSGN and a new MSC/VLR). The steps shown in FIG. 7 except steps 9, 10, 15, 16, 22, and 23 are described in "9.2.4.1 of 3GPP TS 23.060 v3.4.0". Therefore, the following description of FIG. 7 is made mainly on the added steps. The signal processing shown in FIG. 7 occurs when an MS requests its relocation to a new SGSN server before SRNS relocation in the absence of traffic being transmitted or received from or at the MS. This is termed location registration.

If the MS requests a location registration in step 1, the MS transmits a Routing Area update Request message to a new 2G SGSN in step 2, and then steps 3 through 8 are performed. Upon receipt of an SGSN Context Acknowledge message acknowledging the routing area update request from the new 2G SGSN, an old 3G SGSN server transmits an ADD Request message requesting relocation of the MS to an old 3G S-MGW in step 9. The old 3G S-MGW relocates the MS and transmits an ADD Response message for the ADD Request message to the old 3G SGSN server in step 10. Then, conventional steps 11 through 14 are performed.

The GGSN server receives an Update PDP Context Request message requesting the update of a modified PDP in step 14. In step 15, the GGSN server transmits a MODIFY Request message to the G-MGW, requesting update of the MS location information. The G-MGW updates the MS location information. After the updating, the G-MGW transmits a MODIFY Response message for the MODIFY Request message to the GGSN server in step 16. Then, conventional subsequent steps 17 through 21 are performed. In step 22, the old 3G SGSN server transmits a SUBTRACT Request message to the old 3G S-MGW, requesting release of an existing call. In step 23, the old 3G S-MGW transmits a SUBTRACT Response Message to the old 3G SGSN server in step 23, thereby completing the location registration. The subsequent steps 24 through 29 have already been defined as mentioned before. Therefore, their description is omitted here. Then, conventional steps 30 through 38 are performed. BSS packet flow context procedure is additionally performed between the BSS and the new 2G-SGSN.

As described above referring to FIG. 7, steps 9, 10, 15, 16, 22, and 23 are additionally performed to process signals between the separated elements SGSN server and S-MGW and between the separated elements GGSN server and G-MGW for location registration in the first embodiment of the present invention.

Figure 8:
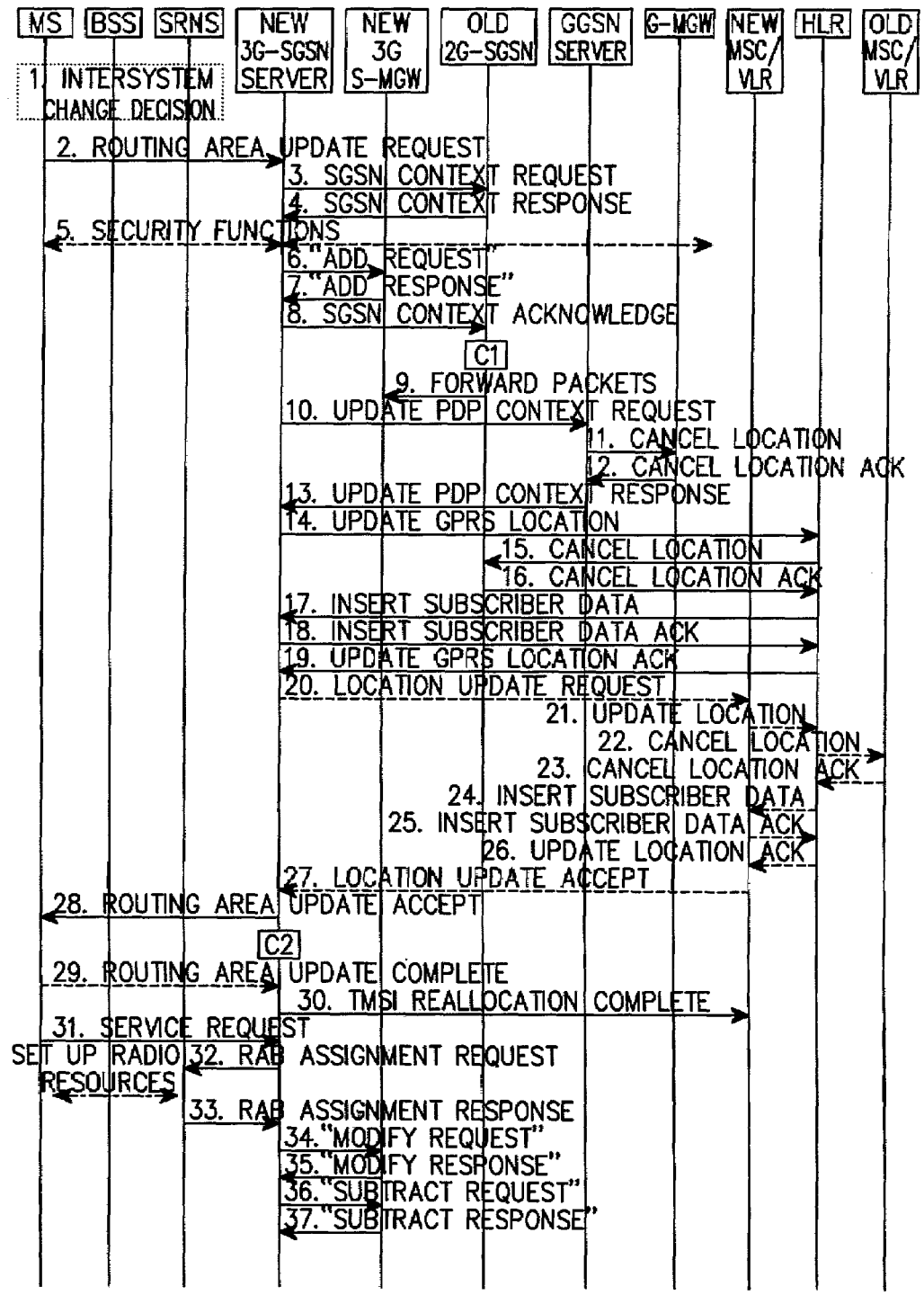
FIG. 8 is an information flow diagram illustrating GSM to UMTS inter-SGSN change according to the present invention.

FIG. 8 is an information flow diagram illustrating GSM to UMTS inter SGSN change according to the present invention. In FIG. 8, location registration is performed from a conventional core network with a non-separation structure (an old SGSN and an old MSC/VLR) to a core network with separated elements (a new SGSN server and a new S-MGW) according to the present invention. The steps shown in FIG 8 except steps 6, 7, 11, 12, and 34 through 37 are described in "9.2.4.1 of 3GPP TS 23.060 v3.4.0". Therefore, the following description of FIG. 8 is made mainly on the added steps. The signal processing shown in FIG. 8 occurs when an MS requests its relocation to a new SGSN server before SRNS relocation in the absence of traffic being transmitted or received from or at the MS. This is called location registration.

If the MS requests a location registration in step 1, the MS transmits a Routing Area update Request message to a new 3G SGSN server in step 2, and then steps 3, 4 and 5 are performed. The new 3G SGSN server transmits an ADD Request message requesting relocation of the MS to a new 3G S-MGW in step 6. The new 3G S-MGW relocates the MS and transmits an ADD Response message for the ADD Request message to an old 2G SGSN in step 7. Then, steps 8 through 10 are performed in the conventional manner. The GGSN server receives an Update PDP Context Request message requesting update of a modified PDP in step 10. In step 11, the GGSN server transmits a MODIFY Request message to the G-MGW. The G-MGW transmits a MODIFY Response message for the MODIFY Request message to the GGSN server in step 12. Then, conventional subsequent steps 13 through 33 are performed. In step 34, the new 3G SGSN server transmits a MODIFY Request message requesting update of the MS location information to the new 3G S-MGW. The new 3G S-MGW updates the MS location information. In step 35, the new 3G S-MGW transmits a MODIFY Response message for the MODIFY Request message to the new 3G SGSN server.

The new 3G SGSN server transmits a SUBTRACT Request message to the new 3G S-MGW, requesting release of an existing call in step 36. In step 37, the new 3G S-MGW transmits a SUBTRACT Response Message to the new 3G SGSN server, thereby completing the location registration.

As described above referring to FIG. 8, steps 6, 7, 11, 12, and 34 through 37 are additionally performed to process signals between the separated elements SGSN server and S-MGW and between the separated elements GGSN server and G-MGW for location registration in the second embodiment of the present invention.

In accordance with the present invention, separation of user information transport and control information transport in a core network enhances expansibility, and implementation of a G-MGW located at a PLMN termination at the same node as an MGW in the CS domain increases the use efficiency of transmission resources. Furthermore, compatibility with UMTS based on the MeGaCo/H.248 protocol provides a simple, stable MGW control protocol suitable for an open structure. The MGW control protocol is easily operated because it can be separately managed in software upgrades.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of establishing a packet data path in a packet switching network having a UTRAN (UMTS Terrestrial Access Network) connected to an MS (Mobile Station), an RNC (Radio Network Controller) included in the UTRAN, an SGSN (Serving GPRS Support Node) server connected to the RNC for processing first control information received from the MS through the RNC, an S-MGW (SGSN-Media Gateway) connected to the RNC for switching packet data received from the MS, a GGSN (Gateway GPRS Support Node) connected to the SGSN server for processing second control information resulting from processing the first control information, and a G-MGW (GGSN-MGW) connected to the S-MGW for switching the packet data, the method comprising the steps of:

transmitting a first message requesting PDP (Packet Data Protocol) context activation included in the first control information from the MS to the SGSN server;

transmitting a second message representative of a switching path for the S-MGW from the SGSN server to the S-MGW to establish a forward transmission path for transmitting the packet data between the S-MGW and the G-MGW;

transmitting a response message for the second message from the S-MGW to the SGSN server;

transmitting a third message requesting PDP context creation from the SGSN server to the GGSN server in response to the response message for the second message;

transmitting a fourth message representative of a switching path for the G-MGW from the GGSN server to the G-MGW to establish a reverse transmission path for transmitting the packet data between the G-MGW and the S-MGW;

transmitting a response message for the fourth message from the G-MGW to the GGSN server;

transmitting a response message for the third message from the GGSN server to the SGSN server in response to the response message for the fourth message;

establishing the reverse transmission path for the S-MGW by the response message of the third message by the SGSN server; and transmitting a message indicating completed establishment of the forward and reverse transmission paths from the SGSN server to the MS.

2. The method of claim 1, wherein the first through fourth messages include a TEID (Tunnel Endpoint Identifier).

3. A method of releasing a packet data path in a packet switching network having a UTRAN (UMTS Terrestrial Access Network) connected to an MS (Mobile Station), an RNC (Radio Network Controller) included in the UTRAN, an SGSN (Serving GPRS Support Node) server connected to the RNC for processing first control information received from the MS through the RNC, an S-MGW (SGSN-Media Gateway) connected to the RNC for switching packet data received from the MS, a GGSN (Gateway GPRS Support Node) connected to the SGSN server for processing second control information resulting from processing the first control information, and a G-MGW (GGSN-MGW) connected to the S-MGW for switching the packet data, the method comprising the steps of:

transmitting a first message requesting PDP (Packet Data Protocol) context deactivation included in the first control information from the MS to the SGSN server;

transmitting a second message requesting PDP context deletion from the SGSN server to the GGSN server;

transmitting a third message representative of a switching path for the G-MGW from the GGSN server to the G-MGW to release the established transmission path;

releasing the switching path set in the third message in the G-MGW and transmitting a response message for the third message from the G-MGW to the GGSN server;

transmitting a PDP context deletion response message indicating the result of PDP context deletion from the GGSN server to the SGSN server in response to the response message of the third message;

transmitting a fourth message representative of a switching path for the G-MGW from the SGSN server to the S-MGW to release the established transmission path;

releasing the switching path set in the fourth message in the S-MGW and transmitting a response message for the fourth message from the S-MGW to the SGSN server; and transmitting a context deactivation accept message from the SGSN server to the MS.

4. The method of claim 3, wherein the first through fourth messages include a TEID (Tunnel Endpoint Identifier).

5. A SRNS (Source Radio Network Controller) relocation method for an MS (Mobile Station) moving from a source RNC to a target RNC (Radio Network Controller) included in a UTRAN (UMTS Terrestrial Access Network), an SGSN (Serving GPRS Support Node) server connected to the source RNC for processing first control information received from the MS through the source RNC, an S-MGW (SGSN-Media Gateway) connected to the source RNC for switching packet data originated from the MS, a GGSN (Gateway GPRS Support Node) connected to the SGSN server for processing second control information resulting from processing the first control information, and a G-MGW (GGSN-MGW) connected to the S-MGW for switching the packet data, the method comprising the steps of:

transmitting a first message requesting relocation included in the first control information from the MS to the SGSN server;

transmitting a second message requesting forward MS location information to be changed from the SGSN server to a new SGSN server in response to the first message;

transmitting a third message notifying that the location of the MS is changed from the new SGSN server to a new S-MGW in response to the second message;

updating the MS location information according to the third message in the new S-MGW and transmitting a response message for the third message from the new S-MGW to the new SGSN server;

requesting transition of an existing packet service for the MS from the new SGSN server to a target RNC;

accessing a channel for the packet service in the target RNC and transmitting a relocation request acknowledgement message from the target RNC to the new SGSN server;

transmitting a response message for the second message from the new SGSN server to the SGSN server;

requesting SRNS relocation to the source RNC by the SGSN server;

transmitting a fourth message requesting update of the MS location information from the new SGSN server to the new GGSN server when the new SGSN server receives a message notifying that relocation is completed from the source RNC;

transmitting a fifth message requesting establishment of a new transmission path for the packet service according to the updated MS location information from the new GGSN server to the new G-MGW;

establishing the new transmission path according to the fifth message in the new G-MGW and transmitting a response message for the fifth message;

transmitting a response message for the fourth message from the new GGSN server to the new SGSN server in response to the response message of the fifth message;

transmitting a sixth message requesting a new transmission path for the packet service from the new SGSN server to the new S-MGW in response to the response message of the third message;

transmitting the new transmission path according to the sixth message in the new S-MGW and transmitting a response message for the sixth message from the new S-MGW to the new SGSN server whereby completing the establishment of the transmission path;

transmitting a seventh message requesting release of an existing transmission path from the SGSN server to the S-MGW; and releasing the existing transmission path according to the seventh message in the S-MGW and transmitting a response message for the seventh message from the S-MGW.

6. The method of claim 5, wherein the first through seventh messages include a TEID (Tunnel Endpoint Identifier).

* * * * *